US012763479B2

(12) United States Patent
Rao et al.

(10) Patent No.: US 12,763,479 B2
(45) Date of Patent: Oct. 13, 2026

(54) ELECTRONIC DEVICE WITH FOOT ANTENNA

(71) Applicant: Apple Inc., Cupertino, CA (US)

(72) Inventors: Menglou Rao, Austin, TX (US); Louis K Chamberlain, Campbell, CA (US); Michael J Williams, Campbell, CA (US); Joel D Barrera, Cedar Park, TX (US); Ayoub Yari Boroujeni, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/913,952

(22) Filed: Oct. 11, 2024

(65) Prior Publication Data

US 2026/0106381 A1 Apr. 16, 2026

(51) Int. Cl.

| | |
|---|---|
| ***H01Q 13/18*** | (2006.01) |
| ***H01Q 1/22*** | (2006.01) |
| ***H01Q 1/48*** | (2006.01) |

(52) U.S. Cl.

CPC ............... *H01Q 13/18* (2013.01); *H01Q 1/22* (2013.01); *H01Q 1/48* (2013.01)

(58) Field of Classification Search

CPC ............. H01Q 13/18; H01Q 1/22; H01Q 1/48

See application file for complete search history.

(56) References Cited

U.S. PATENT DOCUMENTS

| | | | |
|---|---|---|---|
| 9,178,268 | B2 | 11/2015 | Zhu et al. |
| 9,653,777 | B2 | 5/2017 | Guterman et al. |
| 9,966,653 | B2 | 5/2018 | McAuliffe et al. |
| 10,741,925 | B2 | 8/2020 | Barrera et al. |
| 10,784,572 | B2 | 9/2020 | McAuliffe et al. |
| 11,128,032 | B2 | 9/2021 | Da Costa Bras Lima et al. |
| 2022/0263213 | A1* | 8/2022 | Warren ................. F21V 21/044 |
| 2023/0223681 | A1 | 7/2023 | Barrera et al. |
| 2023/0395984 | A1 | 12/2023 | Barrera et al. |
| 2025/0112369 | A1* | 4/2025 | Astakhov ............. H01Q 9/0414 |

OTHER PUBLICATIONS

U.S. Appl. No. 18/391,282, filed Dec. 20, 2023.

* cited by examiner

*Primary Examiner* — David E Lotter
(74) *Attorney, Agent, or Firm* — Treyz Law Group, P.C.; Michael H. Lyons

(57) ABSTRACT

An electronic device may include a housing and wireless circuitry. The housing may include a conductive body mounted to a dielectric foot. The wireless circuitry may include wedge-shaped cavity-backed antennas mounted within the dielectric foot. Each antenna may include a dielectric wall, a conductive plate, and a conductive cavity mounted to the conductive plate. The conductive cavity and the conductive plate may define edges of an antenna cavity. The dielectric wall may be mounted to the conductive plate and the conductive cavity overlapping the antenna cavity. The dielectric wall may have an outer surface with a continuous curvature that matches a curvature of the dielectric foot. The dielectric wall may have an inner surface facing the antenna cavity. An antenna resonating element may be mounted to the inner surface. The antenna resonating element may include planar segments separated by folds to help approximate the continuous curvature of the outer surface.

20 Claims, 10 Drawing Sheets

ELECTRONIC DEVICE WITH FOOT ANTENNA

FIELD

This relates generally to electronic devices, including electronic devices with wireless communications capabilities.

BACKGROUND

Electronic devices are often provided with wireless communications capabilities. Electronic devices with wireless communications capabilities include one or more antennas. To satisfy consumer demand for small form factor wireless devices, manufacturers are continually striving to implement wireless communications circuitry such as antennas using compact structures.

It can be challenging to provide an electronic device with antennas that exhibit a satisfactory level of performance. If care is not taken, the compact form factor of the electronic device and the presence of conductive housing structures in the electronic device can deteriorate antenna performance.

SUMMARY

An electronic device may include a housing and wireless circuitry. The housing may include a conductive body mounted to a dielectric foot. The wireless circuitry may include wedge-shaped cavity-backed antennas mounted within the dielectric foot. The antennas may overlap intake vents in the dielectric foot. The dielectric foot may have exhaust vents opposite the intake vents. Air may flow through gaps between the antennas.

Each antenna may include a dielectric wall, a conductive plate, and a conductive cavity. The conductive cavity may be mounted to the conductive plate. The conductive cavity and the conductive plate may define edges of an antenna cavity. The antenna cavity may have an open end. The dielectric wall may be mounted to the conductive plate and the conductive cavity overlapping the open end. The dielectric wall may have an outer surface with a continuous curvature that matches a continuous curvature of the dielectric foot. The dielectric wall may have an inner surface facing the antenna cavity.

The antenna may include an antenna resonating element mounted to the inner surface. The antenna resonating element may include planar segments separated by folds to help approximate the continuous curvature of the outer surface without sacrificing mechanical support. Alignment posts in the cavity may extend through elongated alignment holes in the antenna resonating element. The alignment posts may have orthogonal orientations. The alignment pins may include crush pins that help secure the alignment posts to the antenna resonating element. The antenna resonating element may be grounded to the conductive plate by a return path. A laser etched region of the conductive plate may help to control the shape of a solder ball used to couple the return path to the conductive plate.

DETAILED DESCRIPTION

Figure 1:
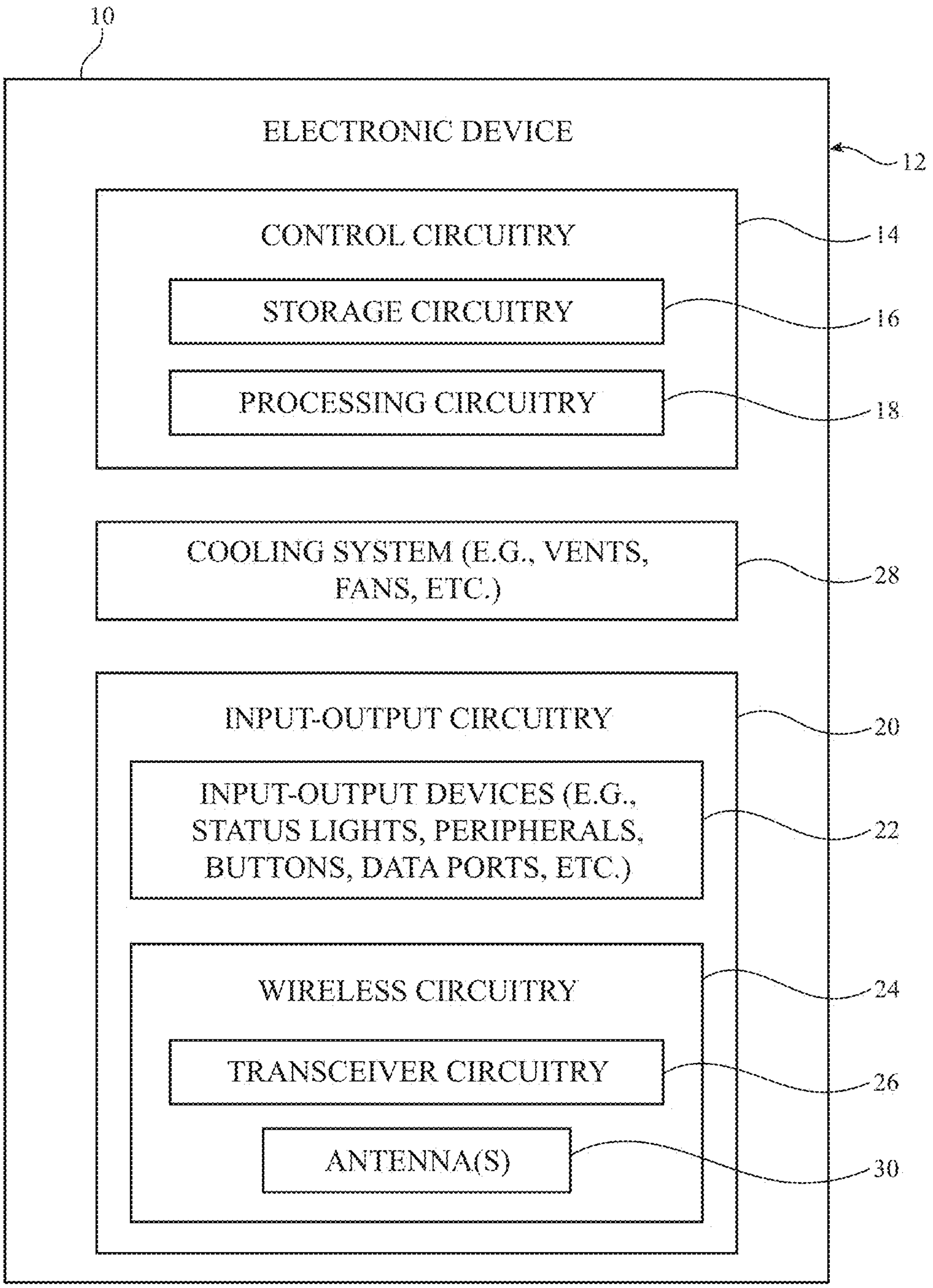
FIG. 1 is a schematic diagram of an illustrative electronic device with wireless circuitry in accordance with some embodiments.

An electronic device such as electronic device 10 of FIG. 1 may be provided with wireless circuitry that includes antennas. The antennas may be used to transmit and/or receive wireless radio-frequency signals. Device 10 may be a portable electronic device or another suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment. Implementations in which device 10 is a compact and portable desktop computer are sometimes described herein as a non-limiting example.

Device 10 may include a housing such as housing 12. Housing 12, which may sometimes be referred to as a case or enclosure, may be formed of plastic, glass, ceramics, sapphire, fiber composites, metal (e.g., stainless steel, aluminum, titanium, gold, etc.), rubber, silicone, other suitable materials, or a combination of these materials. If desired, housing 12 may include one or more portions formed from metal materials and may include one or more portions formed from dielectric materials.

As shown in the schematic diagram of FIG. 1, device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include non-removable storage that is fixed within device 10 and/or may include removable storage.

Control circuitry 14 may also include processing circuitry such as processing circuitry 18. Processing circuitry 18 may be used to control the operation of device 10. Processing circuitry 18 may include one or more processors such as microprocessors, microcontrollers, digital signal processors, host processors, baseband processor integrated circuits, application specific integrated circuits, graphics processing units, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include one or more data ports (e.g., universal serial bus (USB) ports such as USB-C ports, networking ports such as Ethernet ports, display ports such as HDMI ports, etc.), buttons (e.g., power buttons, volume buttons, etc.), status lights (e.g., power indicator lights), audio ports (e.g., headphone jacks, microphone jacks, etc.), and/or other input-output devices. If desired, input-output devices 22 may include one or more peripheral devices (e.g., peripheral devices communicatively coupled to device 10 by one or more data ports such as a USB port) such as keyboards, scrolling wheels, mice, track pads, touch pads, keypads, microphones, etc. If desired, input-output devices 22 may also include other devices such as cameras, speakers, light sources, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and/or other sensors. In embodiments where device 10 is a portable desktop computer, device 10 may be implemented without an integrated display. Device 10 may, if desired, be communicatively coupled to an external display, television, or monitor using wired cabling (e.g., coupled to a data port in input-output devices 22) and/or using wireless signals. Alternatively, device 10 may include a display (e.g., a touch sensitive display that displays images and receives touch input).

Input-output circuitry 20 may include wireless circuitry such as wireless circuitry 24 for wirelessly conveying radio-frequency signals. Although control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include radio-frequency transceiver circuitry such as transceiver circuitry 26 for handling transmission and/or reception of radio-frequency signals within corresponding frequency bands at radio frequencies (sometimes referred to herein as communications bands or simply as "bands"). The frequency bands handled by radio-frequency transceiver circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi®6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, 6G bands at sub-THz frequencies between around 100 GHz and around 10 THz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 24 may also be used to perform spatial ranging operations if desired.

The UWB communications handled by radio-frequency transceiver circuitry 26 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Transceiver circuitry 26 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 26 may include one or more integrated circuits (e.g., radio or modem chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, clocking circuitry, transmission line structures, and other circuitry for handling radio-frequency signals and/or for converting signals between radio-frequencies, intermediate frequencies, and/or baseband frequencies.

In general, radio-frequency transceiver circuitry 26 may cover (handle) any desired frequency bands of interest. As shown in FIG. 1, wireless circuitry 24 may include one or more antennas such as antennas 30. Transceiver circuitry 26 may convey radio-frequency signals using one or more antennas 30 (e.g., antennas 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Antennas 30 in wireless circuitry 24 may be formed using any suitable antenna structures. For example, antennas 30 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 30 may include antennas with dielectric resonating elements such as dielectric resonator antennas. If desired, one or more of antennas 30 may be cavity-backed antennas. Two or more antennas 30 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands. In some implementations that are described herein as an example, antennas 30 may have antenna resonating elements that include inverted-F antenna arms backed by a conductive cavity (e.g., antennas 30 may be cavity-backed inverted-F antennas). This is illustrative and non-limiting and, in general, antennas 30 may include any desired antenna structures.

If desired, device 10 may also include thermal management components such as cooling system 28. Cooling system 28 may include one or more air vents (e.g., cool air intake vents and/or hot air exhaust vents), one or more fans, one or more heat spreaders, one or more heat sinks, a liquid or water-based cooling system, and/or any other desired components that help to manage and regulate thermal load and temperature in device 10.

Figure 2:
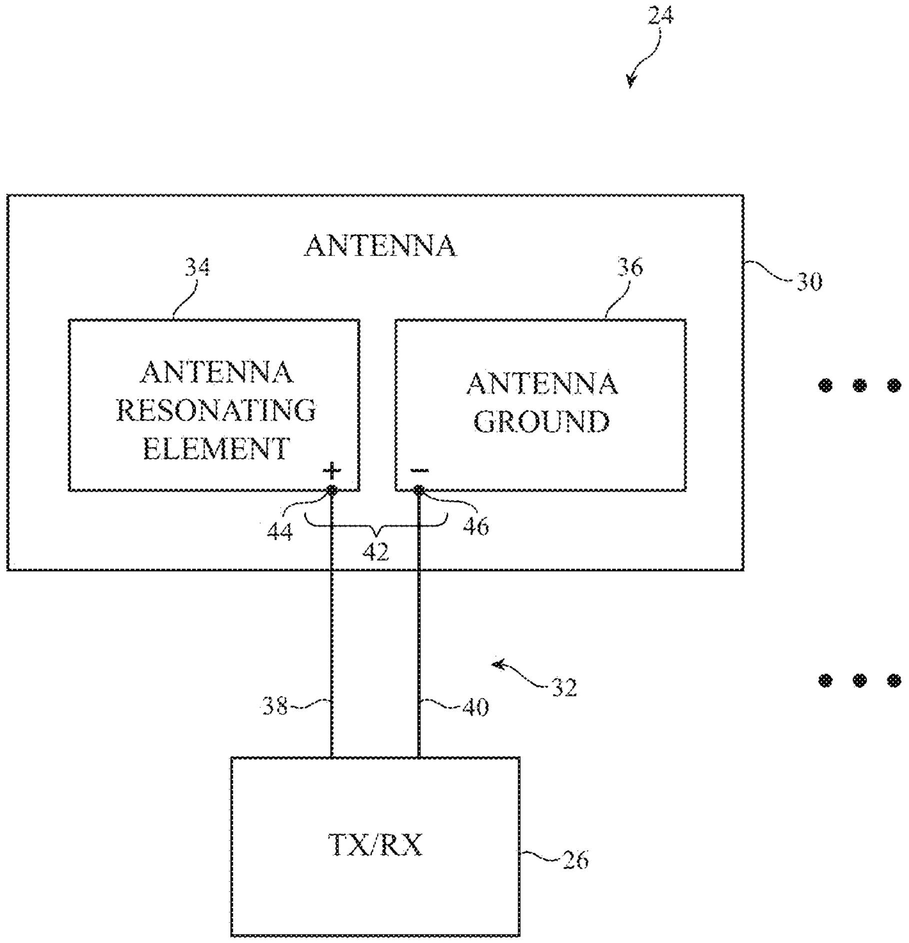
FIG. 2 is a schematic diagram of illustrative wireless circuitry in accordance with some embodiments.

FIG. 2 is a schematic diagram showing how a given antenna 30 may be fed by transceiver circuitry 26. As shown in FIG. 2, antenna 30 may have a corresponding antenna feed 42. Antenna 30 may include one or more antenna resonating (radiating) elements 34 and an antenna ground 36. Antenna resonating element(s) 34 may include one or more radiating arms, slots, waveguides, dielectric resonators, patches, parasitic elements, indirect feed elements, and/or any other desired antenna radiators. Antenna feed 42 may include a positive antenna feed terminal 44 coupled to at least one antenna resonating element 34 and may include a ground antenna feed terminal 46 coupled to antenna ground 36. If desired, one or more conductive paths (sometimes referred to herein as ground paths, short paths, or return paths) may couple antenna resonating element(s) 34 to antenna ground 36.

Transceiver (TX/RX) circuitry 26 may be coupled to antenna feed 42 by a radio-frequency transmission line path 32 (sometimes referred to herein as transmission line path 32). Transmission line path 32 may include a signal conductor such as signal conductor 38 (e.g., a positive signal conductor). Transmission line path 32 may include a ground conductor such as ground conductor 40. Ground conductor 40 may be coupled to ground antenna feed terminal 46 of antenna feed 42. Signal conductor 38 may be coupled to positive antenna feed terminal 44 of antenna feed 42.

Transmission line path 32 may include one or more radio-frequency transmission lines. The radio-frequency transmission line(s) in transmission line path 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 32. Filter circuitry, switching circuitry, impedance matching circuitry, phase shifter circuitry, amplifier circuitry, and/or other circuitry may be interposed on transmission line path 32, if desired. One or more antenna tuning components for adjusting the frequency response of antenna 30 in one or more bands may be disposed on transmission line path 32 and/or may be integrated within antenna 30 (e.g., coupled between the antenna ground and the antenna resonating element of antenna 30, coupled between different portions of the antenna resonating element of antenna 30, etc.).

If desired, one or more of the radio-frequency transmission lines in transmission line path 32 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 3:
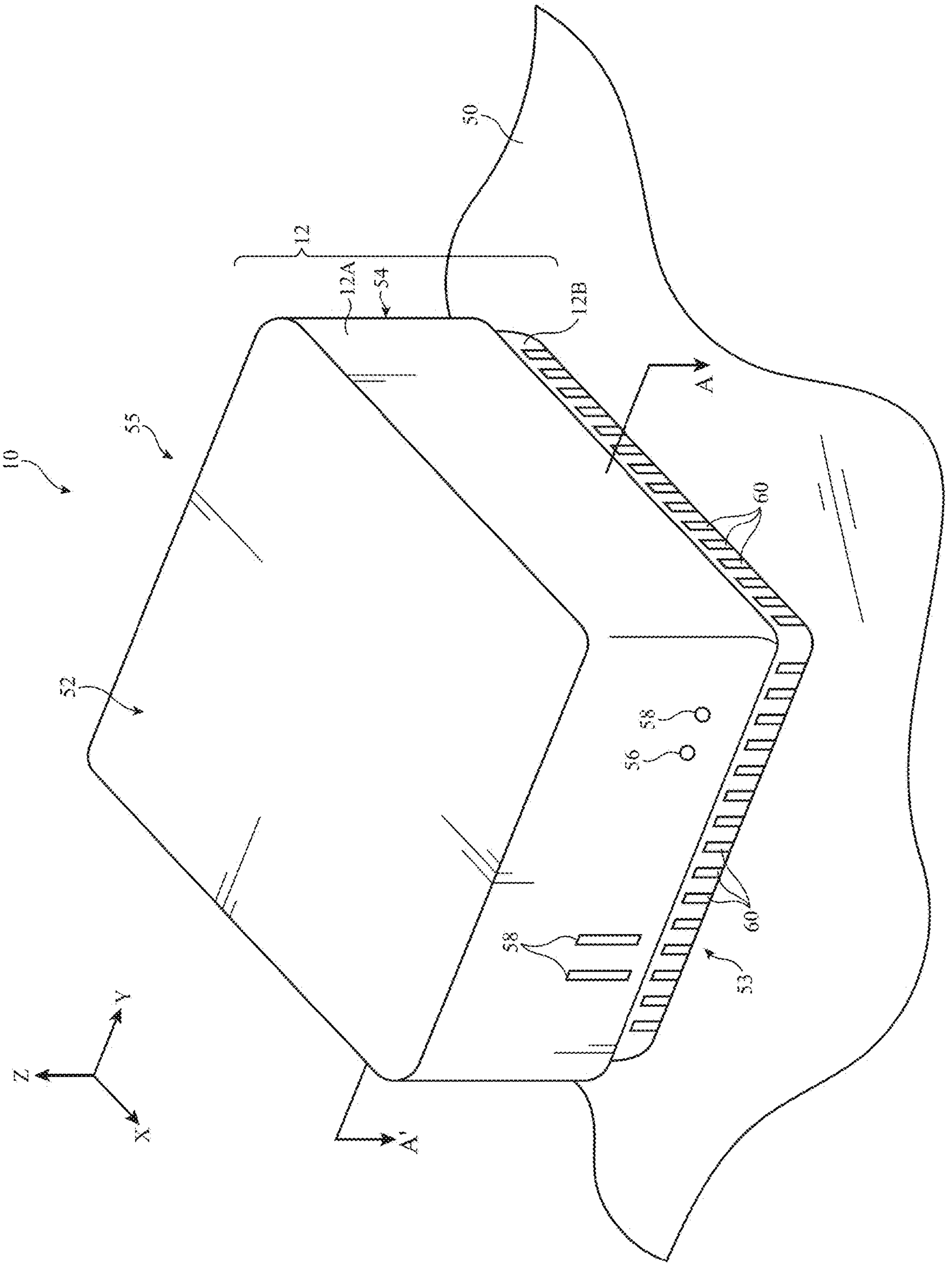
FIG. 3 is a perspective view of an illustrative electronic device having a housing that includes a conductive body mounted to a dielectric foot in accordance with some embodiments.

The housing 12 (FIG. 1) of device 10 may include conductive housing structures and dielectric housing structures. FIG. 3 is an exterior perspective view showing one example in which housing 12 includes conductive housing structures and dielectric housing structures (e.g., in an implementation where device 10 is a portable desktop computer or a portable media player device). As shown in FIG. 3, housing 12 may include conductive housing structures such as conductive body 12A (sometimes also referred to herein as conductive main housing 12A, conductive main body 12A, conductive housing 12A, conductive housing portion 12A, conductive shell 12A, or conductive enclosure 12A).

Conductive body 12A may be formed from metal (e.g., stainless steel, aluminum, titanium, gold, etc.). Conductive body 12A may include a conductive upper (top) wall 52 that forms an upper (top) surface of device 10. Conductive body 12A may also include peripheral conductive housing structures such as conductive sidewalls 54. Conductive sidewalls 54 extend around the lateral periphery of conductive upper wall 52 and downwards away from conductive upper wall 52. Conductive sidewalls 54 and conductive upper wall 52 may surround an interior cavity of device 10. Components of device 10 (e.g., components forming some or all of control circuitry 14, cooling system 28, and/or input-output circuitry 20 of FIG. 1) may be mounted within the interior cavity. Conductive sidewalls 54 may laterally extend around the interior cavity and the components disposed within the interior cavity.

In the example of FIG. 3, conductive upper wall 52 has a substantially rectangular (e.g., square) shape with rounded edges. This is illustrative and non-limiting. If desired, conductive upper wall 52 may have a circular shape, an elliptical shape, or any other desired shape (e.g., having any desired number of straight and/or curved edges). In implementations where conductive upper wall 52 is circular, conductive body 12A may have a substantially cylindrical shape. If desired, conductive sidewalls 54 and conductive upper wall 52 may be formed/machined from different respective integral portions of the same piece of conductive material or metal (e.g., in a unibody configuration).

If desired, conductive body 12A may include one or more connector ports 58. Connector ports 58 may extend through conductive sidewalls 54 and/or conductive upper wall 52. Connector ports 58 may, for example, include data ports (e.g., USB-C ports, other USB ports, HDMI ports, etc.), networking ports (e.g., an Ethernet port), and/or audio ports (e.g., a microphone jack and/or a headphone jack) in input-output devices 22 (FIG. 1). If desired, conductive body 12A may also include one or more status lights 56 (e.g., along conductive sidewalls 54 and/or conductive upper wall 52). Status light 56 may indicate a power state of device 10, as one example. If desired, conductive body 12A may include one or more buttons and/or any other input-output devices 22 (FIG. 1). As shown in the non-limiting example of FIG. 3, conductive body 12A may include one or more connector ports 58 and status lights 56 disposed on a conductive sidewall 54 at a first (front) side 53 of device 10. If desired, device 10 may include one or more connector ports 58, a power port (e.g., a port or plug receptacle configured to receive a power cable to power device 10), and/or other components disposed on an opposing conductive sidewall 54 at a second (rear) side 55 of device 10 opposite front side 53.

Housing 12 may also include dielectric housing structures such as dielectric foot 12B (sometimes also referred to herein as dielectric base 12B, dielectric base housing 12B, dielectric housing 12B, or dielectric housing portion 12B). Conductive body 12A may be mounted to an upper surface or wall of dielectric foot 12B. The components in device 10 may be enclosed within and/or between conductive body 12A and dielectric foot 12B. Dielectric foot 12B may have a lower surface or wall that rests on, that contacts, and/or that may be placed on an underlying surface 50 (e.g., a table, desk, floor, etc.). Dielectric foot 12B may hold conductive body 12A at a fixed distance from surface 50.

Dielectric foot 12B may be formed from plastic or other dielectric materials. Dielectric foot 12B may have the same shape/outline as conductive body 12A or may have a different shape/outline than conductive body 12A. If desired, dielectric foot 12B may include a set of air vents such as vents 60. Vents 60 may extend around some or all of the periphery of dielectric foot 12B and may allow air to flow between the exterior of device 10 and the interior cavity of dielectric foot 12B. Vents 60 may, for example, form part of the cooling system 28 for device 10 (FIG. 1).

Conductive portions of housing 12 such as conductive body 12A may provide device 10 with a uniform and attractive cosmetic appearance, robust structural integrity and mechanical support, and a strong barrier from external forces, contaminants, and moisture for the components mounted within device 10, while also allowing device 10 to exhibit a very compact and portable form factor. If care is not taken, conductive body 12A can undesirably block antennas 30 (FIG. 1) from conveying radio-frequency signals in one or more directions and/or can otherwise limit the wireless performance of wireless circuitry 24. To help mitigate these issues without expanding the form factor of device 10, the antennas 30 of device 10 may be mounted within the interior cavity of dielectric foot 12B.

Figure 4:
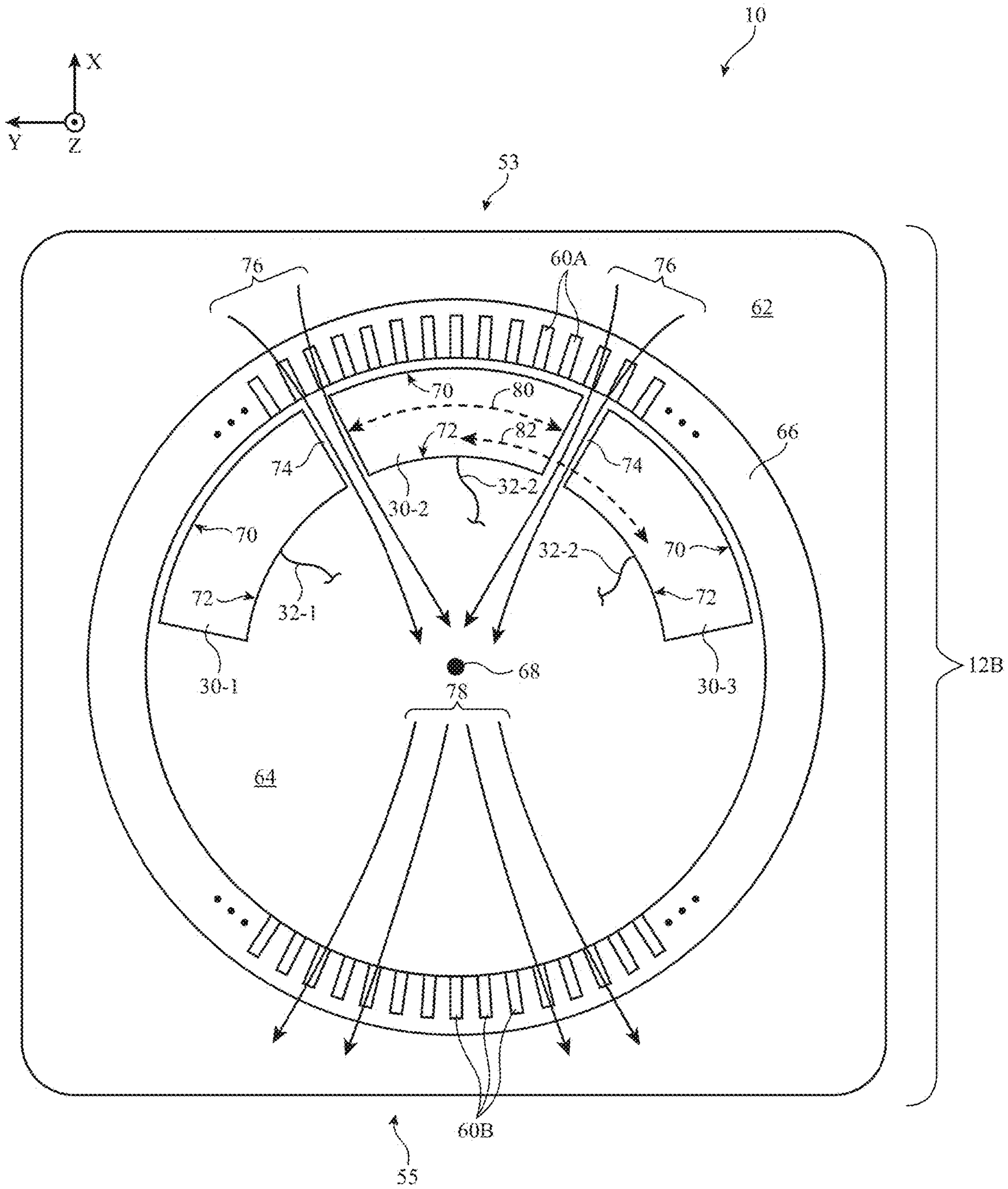
FIG. 4 is an interior top view showing how a set of antennas may be mounted within the dielectric foot of a housing for an electronic device in accordance with some embodiments.

FIG. 4 is an interior top view of dielectric foot 12B (e.g., as taken in the direction of line AA' of FIG. 3) showing one example of how antennas 30 may be mounted within dielectric foot 12B. As shown in FIG. 4, dielectric foot 12B may include a first planar portion such as upper wall 62 and a second planar portion such as lower wall 64. Upper wall 62 may lie in a first plane (e.g., parallel to the X-Y plane of FIGS. 3 and 4 and parallel to conductive upper wall 52 of FIG. 3). Lower wall 64 may lie in a second plane parallel to the first plane. Upper wall 62 may be vertically separated from conductive upper wall 52 of conductive body 12A (FIG. 3) by a first distance. Lower wall 64 may be vertically separated from conductive upper wall 52 of conductive body 12A may be a second distance longer than the first distance.

The bottom end of conductive body 12A (FIG. 3) may be mounted to upper wall 62. The peripheral outer edge of upper wall 62 may be coupled to conductive sidewalls 54 and may follow the lateral outline of conductive body 12A. Upper wall 62 may also have a peripheral inner edge facing lower wall 64. Angled sidewall 66 may couple a peripheral outer edge of lower wall 64 to the peripheral inner edge of upper wall 62. Angled sidewall 66 may extend at a non-parallel angle with respect to upper wall 62 and lower wall 64. Angled sidewall 66 may be perpendicular to upper wall 62 and lower wall 64 or, as shown in the example of FIG. 4, may extend at a non-perpendicular and non-parallel angle from lower wall 64 up to upper wall 62.

Angled sidewall 66 and lower wall 64 may surround an interior cavity of dielectric foot 12B (e.g., angled sidewall 66 may laterally extend around the periphery of the interior cavity of dielectric foot 12B). The interior cavity of dielectric foot 12B may be continuous with the interior cavity of conductive body 12A (FIG. 3) or may, if desired, be separated from the interior cavity of conductive body 12A by one or more components in conductive body 12A such as a system ground plane and/or main logic board of device 10. Upper wall 62, lower wall 64, and angled sidewall 66 may be formed from plastic or other dielectric materials.

Device 10 may have a central axis 68 extending through the lateral center of device 10 (e.g., through the center of lower wall 64 and parallel to the Z-axis). In the example of FIG. 4, the outer peripheral edge of upper wall 62 follows the lateral shape of conductive body 12A (FIG. 3). If desired, the inner peripheral edge of upper wall 62, angled sidewall 66, and the outer peripheral edge of lower wall 64 may have a different shape than conductive body 12A. As shown in the example of FIG. 4, the inner peripheral edge of upper wall 62, angled sidewall 66, and the outer peripheral edge of lower wall 64 may have a circular shape or lateral outline. In implementations where angled sidewall 66 extends at a non-perpendicular angle between lower wall 64 and upper wall 62, the portion of dielectric foot 12B formed from lower wall 64 and angled sidewall 66 may form a portion of an inverted cone, for example. The example of FIG. 4 is illustrative and non-limiting. In general, dielectric foot 12B may have other shapes.

Lower wall 64 of dielectric foot 12B may be lie on surface 50 (FIG. 3). Angled sidewall 66 may serve to raise or separate upper wall 62 and conductive body 12A (FIG. 3) from surface 50 by a non-zero distance. Vents 60 may be formed in angled sidewall 66 and may allow air to pass between the interior cavity of dielectric foot 12B and the exterior of device 10. If desired, vents 60 may include intake vents 60A and exhaust vents 60B. Intake vents 60A may pass cool air from the exterior of device 10 into the interior cavity of dielectric foot 12B, as shown by arrows 76. Exhaust vents 60B may pass warm air from the interior cavity of dielectric foot 12B to the exterior of device 10, as shown by arrows 78. This may serve to dissipate thermal load produced by the electrical operation of components within device 10, which helps to cool device 10. If desired, device 10 may include one or more fans in its interior cavity (e.g., in cooling system 28 of FIG. 1) that help to draw cool air into device 10 through intake vents 60A and/or that help to push warm air out of device 10 through exhaust vents 60B. If desired, intake vents 60A may be disposed at front side 53 of device 10 whereas exhaust vents 60B are disposed at rear side 55 of device 10. This is illustrative and non-limiting and, if desired, the intake and exhaust vents may be at other positions.

As shown in FIG. 4, device 10 may include a set of antennas 30 such as antennas 30-1, 30-2, and 30-3 disposed within the interior cavity of dielectric foot 12B. Antennas 30-1 and/or 30-3 may be omitted if desired. Device 10 may include more than three antennas 30 in dielectric foot 12B if desired. Because upper wall 62, lower wall 64, and angled sidewall 66 are formed from dielectric material, antennas 30-1, 30-2, and 30-3 may convey radio-frequency signals with external communications equipment through dielectric foot 12B without the radio-frequency signals being blocked by conductive body 12A (FIG. 3) and without increasing the form factor of device 10. The placement and shape of antennas 30 may help to configure the antennas to provide a sufficient level of coverage across the hemisphere above surface 50 (FIG. 3) despite the presence of conductive body 12A on top of dielectric foot 12B.

Antenna 30-1 may be fed by a corresponding transmission line path 32-1. Antenna 30-2 may be fed by transmission line path 32-2. Antenna 30-3 may be fed by transmission line path 32-3. Transmission line paths 32-1, 32-2, and 32-3 may couple antennas 30-1, 30-2, and 30-3 to the same transceiver or to two or more different transceivers. If desired, antennas 30-1, 30-2, and 30-3 may each convey radio-frequency signals in the same frequency band. If desired, one or more of antennas 30-1, 30-2, and 30-3 may convey radio-frequency signals in an additional frequency band not covered by the other antennas. In one exemplary implementation, antenna 30-2 may convey radio-frequency signals for a Bluetooth transceiver in device 10 in a 2.4 GHz Bluetooth band and antennas 30-1 and 30-3 may convey radio-frequency signals for the Bluetooth transceiver in the 2.4 GHz Bluetooth band as well as for a Wi-Fi transceiver in one or more Wi-Fi bands. This is illustrative and non-limiting. In general, antennas 30 may cover any desired bands. Antennas 30-1, 30-2, and 30-3 may each cover different respective bands if desired.

Antennas 30-1, 30-2, and 30-3 may be mounted to lower wall 64 at different respective angular positions (polar angles) about central axis 68. The center of antenna 30-2 may be separated from the center of antenna 30-1 and the center of antenna 30-3 by an angular separation 82. In some implementations, angular separation 82 may be equal to 120 degrees (e.g., where each antenna 30 covers a third of the circumference around central axis 68). However, this type of angular separation can inhibit the dissipation of thermal load out rear side 55 of device 10. To mitigate these issues, angular separation 82 may be less than 120 degrees (e.g., 20-90 degrees) and/or antennas 30-1, 30-2, and 30-3 may be positioned to substantially face front side 53 of device 10 (e.g., facing and/or overlapping intake vents 60A). In addition, angular separation 82 may be selected to laterally separate antenna 30-2 from antenna 30-1 and from antenna 30-2 by respective gaps 74. Cool air may pass from the exterior of device 10, through intake vents 60A, and into the interior of device 10 through gaps 74 (as shown by arrows 76). In this way, the positioning of antennas 30-1, 30-2, and 30-3 may balance wireless directivity with thermal management requirements.

Each antenna 30 may have an outer sidewall 70 facing angled sidewall 66 of dielectric foot 12B. Each antenna 30 may also have an inner sidewall 72 opposite its outer sidewall 70 and facing central axis 68. Each antenna 30 may include an antenna resonating element disposed at, adjacent to, and/or overlapping its outer sidewall 70. Each antenna 30 may also include a conductive cavity that forms its inner sidewall 72 and that forms a conductive cavity back for the antenna resonating element in the antenna. Each antenna 30 may have an angular width 80 (e.g., 20-60 degrees about central axis 68). Outer sidewall 70 may be formed from dielectric material and is sometimes also referred to herein as dielectric sidewall 70 or dielectric wall 70.

The outer sidewall 70 of each antenna 30 may be curved (e.g., may follow a curved path and/or lie in a curved surface). As such, the outer sidewall 70 of each antenna 30 may have a non-zero curvature about central axis 68. The outer sidewall 70 of each antenna 30 may extend parallel to the peripheral outer edge of lower wall 64 and angled sidewall 66. For example, the outer surface of outer sidewall 70 may exhibit the same non-zero curvature about central axis 68 as angled sidewall 66 (e.g., the outer surface of outer sidewall 70 may have a continuous curvature that match the continuous curvature of angled sidewall 66 about central axis 68). This helps to establish a smooth impedance transition between each point on the antenna resonating element of the antenna and free space through angled sidewall 66, which may help to maximize antenna efficiency and bandwidth. This may also help to expand the radiation pattern and the angular coverage of each antenna 30 to cover as much of the hemisphere over surface 50 (FIG. 3) as possible. If desired, the outer sidewall 70 of each antenna 30 may be pressed against, in contact with, and/or adhered to angled sidewall 66. If desired, the inner sidewall 72 of each antenna 30 may also be curved. The inner sidewall 72 of each antenna 30 may, if desired, extend parallel to the outer sidewall 70 of that antenna 30 (e.g., inner sidewall 72 and outer sidewall 70 may have the same curvature).

Figure 5:
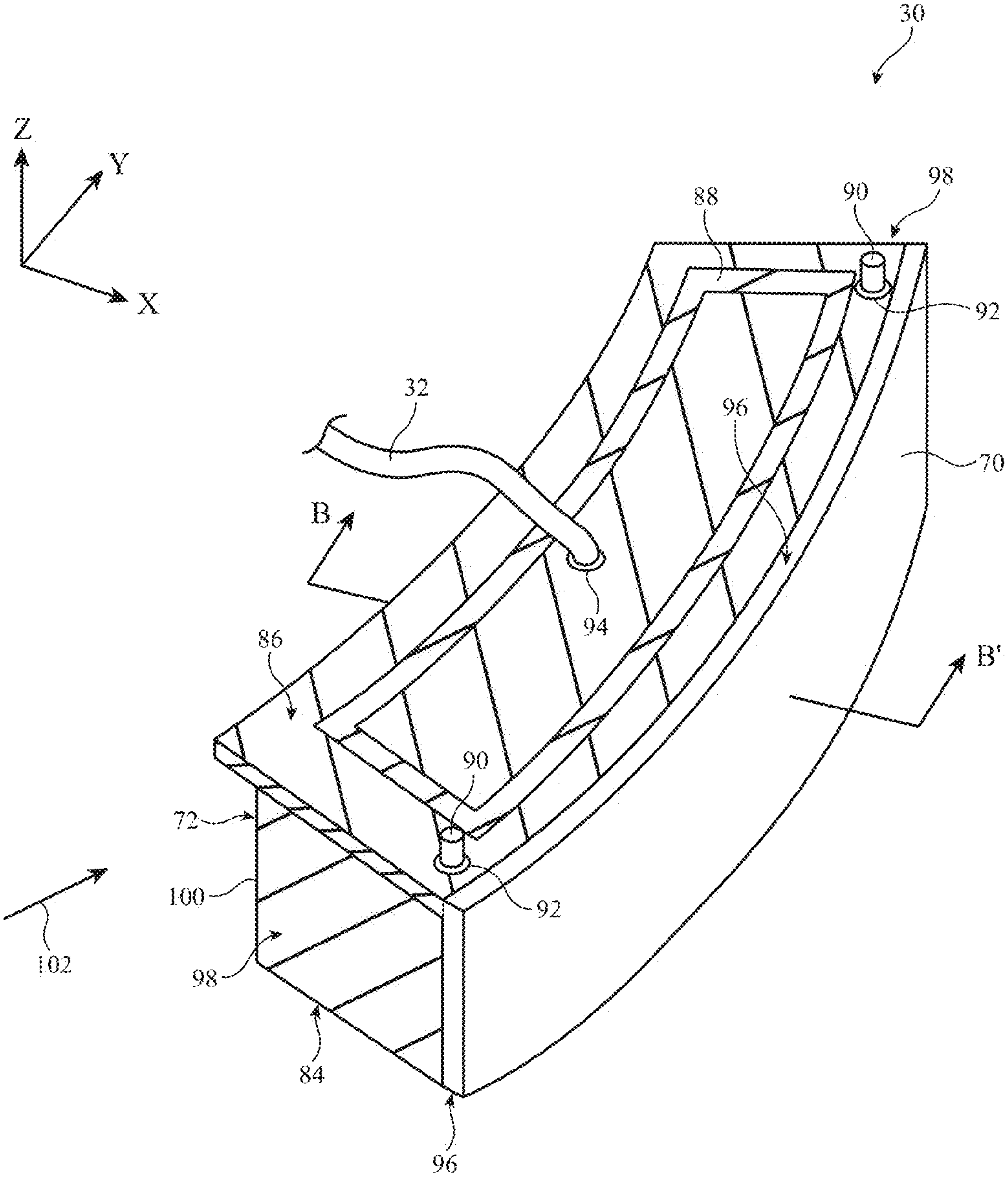
FIG. 5 is a top perspective view of an illustrative antenna in accordance with some embodiments.

FIG. 5 is a top perspective view of an antenna 30 that may be mounted within dielectric foot 12B of device 10. As shown in FIG. 5, antenna 30 (e.g., any of antennas 30-1, 30-2, or 30-3 of FIG. 4) may include a conductive layer such as conductive plate 86 and may include a conductive antenna cavity such as conductive cavity 100. Conductive cavity 100 may be mounted to the periphery of conductive plate 86. Conductive cavity 100 and conductive plate 86 may surround an interior cavity of antenna 30 (not shown in FIG. 5 for the sake of clarity). Outer sidewall 70 may be mounted to conductive plate 86 and conductive cavity 100 overlapping the interior cavity (e.g., the interior cavity may be surrounded and enclosed by conductive plate 86, conductive cavity 100, and outer sidewall 70). Conductive plate 86 is sometimes also referred to herein as grounded conductive plate 86 or grounded plate 86.

Antenna 30 may include an antenna resonating element mounted to outer sidewall 70 within the interior cavity of antenna 30. Antenna 30 may be fed by a transmission line path 32 (e.g., a coaxial cable) that extends into the interior cavity through opening 94 in conductive plate 86. The signal conductor of transmission line path 32 may be coupled to the antenna resonating element in the interior cavity at the positive antenna feed terminal for antenna 30. Conductive plate 86 and conductive cavity 100 may be formed from conductive material such as sheet metal (e.g., stamped and/or folded sheet metal). Conductive plate 86 and conductive cavity 100 may be held at a ground potential and may form part of the antenna ground for antenna 30. A ring of conductive adhesive 88 may electrically couple conductive plate 86 to a system ground of device 10 (e.g., in conductive body 12A of FIG. 3 and/or at the boundary between conductive body 12A and dielectric foot 12B). Conductive body 12A may also be electrically coupled to the system ground. The system ground and conductive body 12A may form part of the antenna ground for antenna 30.

Conductive cavity 100 may include a first conductive wall that forms the inner sidewall 72 of antenna 30 opposite outer sidewall 70. Conductive cavity 100 may include a second conductive wall 84 opposite conductive plate 86. Conductive cavity 100 may include conductive sidewalls 98 that extend from conductive wall 84 to conductive plate 86 (e.g., at opposing sides of conductive plate 86) and that extend from inner sidewall 72 to front sidewall 70. Conductive sidewalls 98, conductive wall 84, and inner sidewall 72 may each be formed from different respective portions of the same piece of stamped sheet metal, as one example.

If desired, outer sidewall 70 may include alignment posts (pins) 90 that extend through alignment holes 92 in conductive plate 86 (e.g., to help align and secure outer sidewall 70 to the rest of antenna 30). If desired, antenna 30 may include strips of adhesive (not shown) on peripheral edges 96 of outer sidewall 70 to help adhere antenna 30 to lower wall 64 (FIG. 4), the system ground of device 10, and/or portions of conductive body 12A (FIG. 3). The curvature of outer sidewall 70 and inner sidewall 72 may follow the curvature of angled sidewall 66 of dielectric foot 12B (FIG. 4), configuring antenna 30 to exhibit a wedge shape (e.g., antennas 30 may be wedge-shaped cavity-backed antennas).

Figure 6:
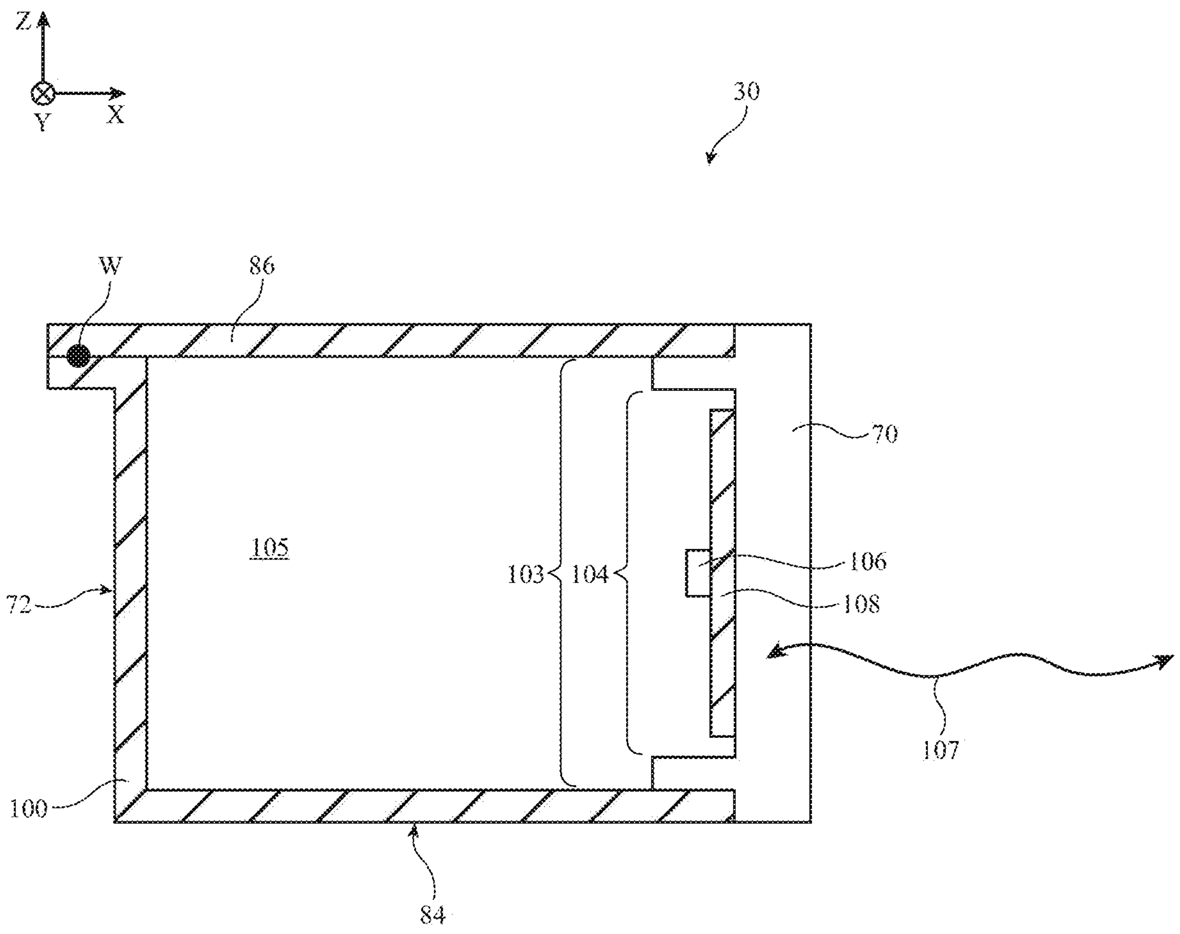
FIG. 6 is a cross-sectional side view of an illustrative antenna in accordance with some embodiments.

FIG. 6 is a cross-sectional side view of antenna 30 (e.g., as taken in the along line BB' of FIG. 5). As shown in FIG. 6, conductive cavity 100 and conductive plate 86 may surround an interior cavity 105 of antenna 30 (e.g., the edges of interior cavity 105 may be defined by conductive plate 86 and conductive cavity 100). Interior cavity 105 is sometimes also referred to herein as antenna cavity 105. Antenna cavity 105 may have an open end 103 opposite inner sidewall 72. Outer sidewall 70 may be mounted to conductive plate 86 and conductive wall 84 of conductive cavity 100 overlapping open end 103 of antenna cavity 105 to surround and enclose antenna cavity 105. If desired, a portion of outer sidewall 70 may be inserted into open end 103 of antenna cavity 105. Conductive plate 86 may be electrically coupled to conductive cavity 100 by one or more welds W, solder, and/or other conductive interconnects. Welds W may also help to mechanically attach/secure conductive plate 86 to conductive cavity 100. Conductive wall 84 may be mounted to (e.g., may contact) lower wall 64 of FIG. 4 when antenna 30 is mounted within dielectric foot 12B.

Antenna 30 may include an antenna resonating element 108 (e.g., antenna resonating element 34 of FIG. 2) mounted to the interior surface of outer sidewall 70 within antenna cavity 105. If desired, outer sidewall 70 may include a recess 104 at/facing antenna cavity 105. Antenna resonating element 108 may be mounted to outer sidewall 70 within recess 104. Recess 104 may help to place antenna resonating element 108 closer to free space (e.g., reducing propagation loss between antenna 30 and free space). Conductive cavity 100 may form a conductive cavity back for antenna resonating element 108 (e.g., antenna resonating element 108 may be a cavity-backed antenna resonating element). If desired, outer sidewall 70 may include one or more alignment posts (pins) 106 that extend through corresponding alignment openings on antenna resonating element 108 to help hold antenna resonating element 108 in a desired position within antenna cavity 105.

Conductive cavity 100 and conductive plate 86 may form part of the antenna ground (e.g., antenna ground 36 of FIG. 3) for antenna 30. Outer sidewall 70 may be formed from dielectric material such as plastic (e.g., injection molded plastic, ABS plastic, etc.), polycarbonate, polymer, epoxy, ceramic, glass, etc. Antenna resonating element 108 may convey radio-frequency signals 107 through outer sidewall 70. Conductive cavity 100 may serve to reflect radio-frequency signals 107 that are transmitted and/or received by antenna resonating element 108, helping to increase the gain and/or improve the radiation pattern of antenna 30. If desired, antenna cavity 105 may have dimensions that are selected to contribute to one or more electromagnetic resonant cavity modes that contribute to the frequency response of antenna 30 (e.g., where conductive cavity 100 and conductive plate 86 establish the boundary conditions of the one or more electromagnetic resonant cavity modes).

Antenna resonating element 108 may be implemented using any desired type of antenna resonating element structures. Antenna resonating element 108 may include, for example, a slot antenna resonating element (e.g., formed from an open or closed dielectric slot in a layer of conductive material on outer sidewall 70), a dipole antenna resonating element, a monopole antenna resonating element, a patch antenna resonating element, etc. In some implementations that are described herein as an example, antenna resonating element 108 may include an inverted-F antenna resonating element.

Figure 7:
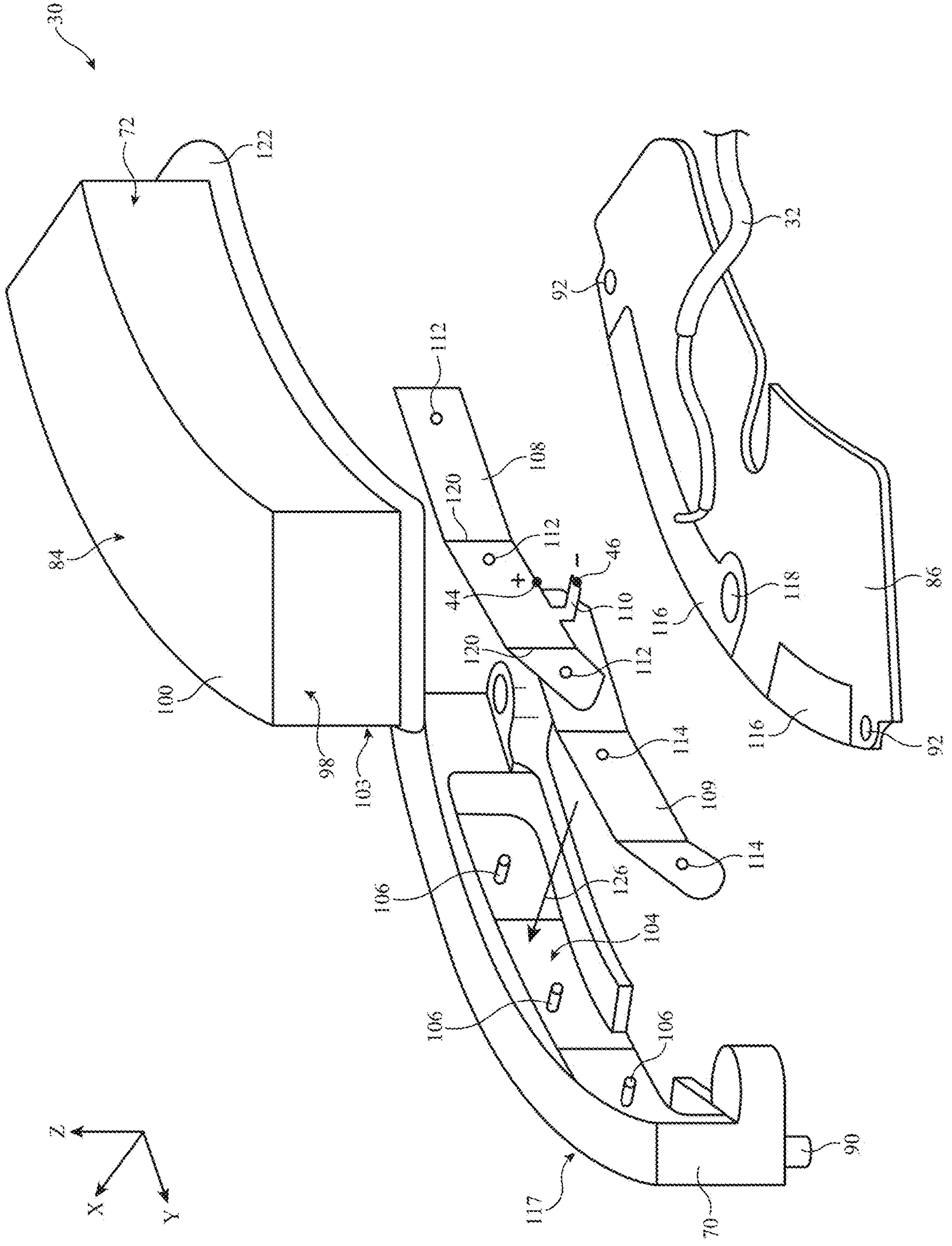
FIG. 7 is an exploded bottom perspective view of an illustrative antenna in accordance with some embodiments.

FIG. 7 is an exploded bottom perspective view of antenna 30 (e.g., as viewed in the direction of arrow 102 of FIG. 5) in an example where antenna resonating element 108 is an inverted-F antenna resonating element. In general, the conductive material used to form antenna resonating element 108 of FIG. 7 may be adapted to implement the antenna resonating element as another type of antenna resonating element if desired (e.g., as a sheet of conductive material containing a slot antenna resonating element, as a pair of dipole arms, as a monopole arm, etc.).

As shown in FIG. 7, outer sidewall 70 may have an outer surface 117 with a continuous curvature that follows the continuous curvature of the angled sidewall of dielectric foot 12B around central axis 68 (FIG. 4). Recess 104 may be formed at the interior/inner side of outer sidewall 70 (opposite outer surface 117). Outer sidewall 70 may include a set of alignment posts 106 within recess 104. A layer of adhesive 109 (e.g., pressure sensitive adhesive) may be inserted into recess 104 as shown by arrow 126. Adhesive 109 may include alignment holes 114 that overlap alignment posts 106. Alignment posts 106 may protrude through alignment holes 114 when adhesive 109 is mounted within recess 104.

Antenna resonating element 108 may be inserted into recess 104 over adhesive 109. Adhesive 109 may adhere antenna resonating element 108 to outer sidewall 70 within recess 104. Antenna resonating element 108 may include alignment holes 112. Alignment posts 106 may protrude through alignment holes 112 when antenna resonating element 108 is mounted to adhesive 109 within recess 104. If desired, recess 104 may have a non-zero curvature that substantially follows the curvature of the outer surface of outer sidewall 70.

In some implementations, the surface of recess 104 may be continuously curved and may extend in parallel to the continuous curvature of the outer surface 117 of outer sidewall 70. In these implementations, adhesive 109 and antenna resonating element 108 may also be continuously curved and may extend parallel to the continuous curvature of the outer surface 117 of outer sidewall 70. This may help to ensure that a continuous and smooth impedance transition is formed between each point on antenna resonating element 108 and the exterior of device 10 through the angled sidewall 66 of dielectric foot 12B (FIG. 4). However, in practice, it can be difficult to ensure that antenna resonating element 108 remains secured/adhered to recess 104 across its entire length when antenna resonating element 108 (e.g., a piece of stamped sheet metal) is continuously curved. This can cause portions of the antenna resonating element to become partially detached or removed from part of outer sidewall 70 (e.g., due to restorative/spring forces of the stamped sheet metal, external forces, thermal effects, etc.), which can produce undesirable impedance transitions from antenna resonating element 108 to free space through outer sidewall 70 and dielectric foot 12B that can detune the antenna, reduce antenna efficiency at one or more frequencies, and/or deteriorate the radiation pattern of the antenna.

To mitigate these issues, rather than being continuously curved, antenna resonating element 108 may include one or more folds 120 (e.g., about axes parallel to the Z-axis) that orient different planar portions of antenna resonating element 108 at non-parallel angles with respect to other planar portions of antenna resonating element 108. Adhesive 109 and the surface of recess 104 may also include different planar portions that are angled by respective joints/bends to be parallel to each of the planar portions of antenna resonating element 108. This configures antenna resonating element 108 to substantially follow the curvature of outer sidewall 70 and helps to expand the angular coverage of the radiation pattern of antenna 30 (relative to an entirely planar antenna resonating element) while also helping to ensure that antenna resonating element 108 remains strongly adhered to recess 104 throughout the operating life of device 10. Alignment posts 106 may help to hold antenna resonating element 108 in place with a desired orientation during and after mounting the antenna resonating element to recess 104.

As shown in FIG. 7, the positive antenna feed terminal 44 of antenna 30 may be coupled to antenna resonating element 108. Antenna resonating element 108 may have a return path 110 (sometimes also referred to herein as short path 110 or grounding path 110) that extends downwards towards conductive plate 86. Return path 110 may be formed from an integral portion or extension of antenna resonating element 108 if desired (e.g., from a folded tail of antenna resonating element 108). The ground antenna feed terminal 46 of antenna 30 may be coupled to the end of return path 110 or elsewhere along conductive plate 86.

After antenna resonating element 108 has been adhered to outer sidewall 70, outer sidewall 70 may be mounted to conductive plate 86 (e.g., as shown in FIGS. 5 and 6). Alignment posts 90 on outer sidewall 70 may be inserted into corresponding alignment holes 92 on conductive plate 86 to help secure outer sidewall 70 to conductive plate 86 in a desired position/orientation relative to conductive plate 86.

Conductive plate 86 may include one or more laser etched regions 116. Conductive plate 86 may include a non-laser-etched region of conductive plate 86 such as contact pad 118. Contact pad 118 may be laterally surrounded by a laser etched region 116. When outer sidewall 70 is mounted to conductive plate 86, the end (tip) of the return path 110 for antenna resonating element 108 may be pressed against contact pad 118. Solder or another conductive interconnect structure may be used to help electrically and/or mechanically connect return path 110 to contact pad 118. The signal conductor of transmission line path 32 may be coupled to antenna resonating element 108 at positive antenna feed terminal 44. Return path 110 may electrically couple antenna resonating element 108 to conductive plate 86 and thus the antenna ground of antenna 30.

After outer sidewall 70 has been mounted to conductive plate 86, conductive cavity 100 may be mounted to conductive plate 86. If desired, conductive cavity 100 may include a protruding peripheral lip 122 that is welded to the peripheral edges of conductive plate 86 (e.g., by welds W of FIG. 6). Conductive plate 86, conductive sidewalls 98, conductive wall 84, and inner sidewall 72 may surround antenna cavity 105 (FIG. 6). The open end 103 of the antenna cavity may face antenna resonating element 108 in recess 104 (e.g., outer sidewall 70 may be disposed within and/or overlapping open end 103). Conductive cavity 100 may help to improve the gain and/or radiation pattern of antenna 30 while also helping to shield/isolate antenna 30 from electromagnetic interference and/or other nearby antennas given the compact form factor of device 10.

When implemented in this way, antenna resonating element 108 may form an inverted-F antenna resonating element for antenna 30 (e.g., a cavity backed inverted-F antenna resonating element). Antenna resonating element 108 is therefore sometimes also referred to herein as inverted-F antenna resonating element 108 or cavity-backed inverted-F antenna resonating element 108. Antenna resonating element 108 may follow an elongated path and may have a length (e.g., measured along the elongated path from the left edge to the right edge of antenna resonating element 108) that is selected to configure antenna 30 to convey radio-frequency signals in one or more desired frequency bands. This length may be, for example, approximately equal to one-quarter the effective wavelength of operation of antenna 30, where the effective wavelength is equal to a vacuum wavelength multiplied by a constant given by the dielectric properties of the materials around antenna resonating element 108.

Figure 8:
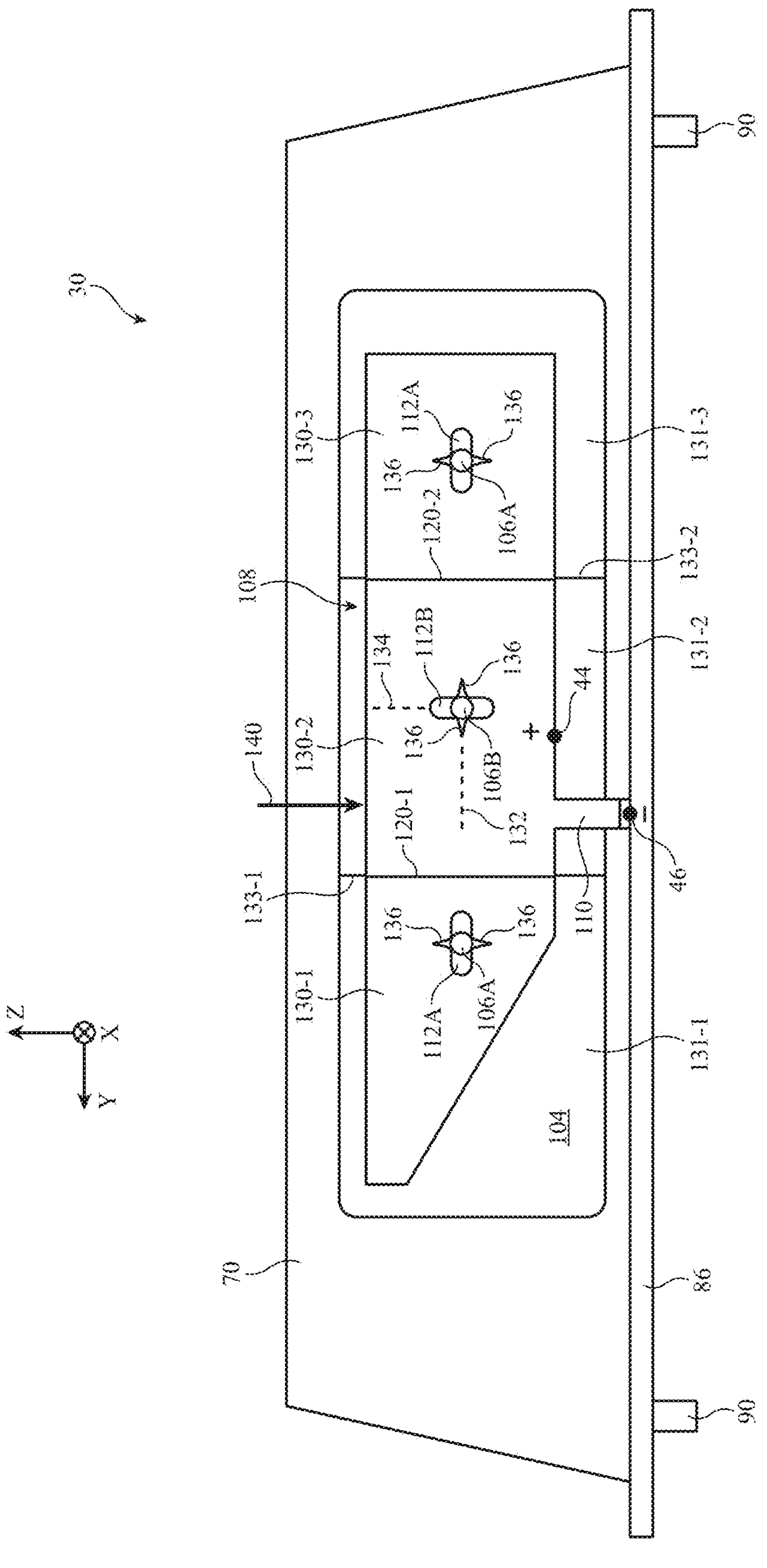
FIG. 8 is an interior rear view of an illustrative antenna resonating element in an antenna of the type shown in FIGS. 4-7 in accordance with some embodiments.

FIG. 8 is an interior rear view of antenna resonating element 108 while mounted within recess 104 of outer sidewall 70 (e.g., as viewed in the direction of arrow 126 of FIG. 7). As shown in FIG. 8, antenna resonating element 108 may include a first fold (bend) 120-1 that separates a first portion 130-1 from a second portion 130-2 of antenna resonating element 108 (e.g., portion 130-1 meets or joins portion 130-2 at fold 120-1). Antenna resonating element 108 may include a second fold (bend) 120-2 that separates portion 130-2 from a third portion 130-3 of antenna resonating element 108 (e.g., portion 130-3 meets or joins portion 130-2 at fold 120-2).

Portions 130-1, 130-2, and 130-3 may be each be planar and are therefore sometimes also referred to herein as planar portions 130 or planar segments 130 of antenna resonating element 108. Portion 130-1 may be oriented at a non-parallel angle with respect to portion 130-2 (e.g., due to fold 120-1). Portion 130-3 may be oriented at a non-parallel angle with respect to portion 130-2 (e.g., due to fold 120-2) and thus at a non-parallel angle with respect to portion 130-1. The relative orientations of portions 130-1, 130-2, and 130-3 may approximate the curvature of the outer surface 117 of outer sidewall 70 (FIG. 7) and the curvature of angled sidewall 66 of dielectric foot 12B (FIG. 4). If desired, antenna resonating element 108 may include more than two folds 120 and more than three portions 130. For example, antenna resonating element 108 may include N folds 120 that separate N+1 portions 130 at different orientations, where N is any desired integer greater than or equal to two (e.g., where antenna resonating element 108 exhibits a continuous curvature as N approaches infinity).

The inner surface of outer sidewall 70 within recess 104 may include N angled corners 133 (e.g., folds or bends) that join respective portions 131 of recess 104. As shown in the example of FIG. 8, recess 104 may include a first angled corner 133-1 and a second angled corner 133-2. Recess 104 may have a first portion 131-1 that meets or joins a second portion 131-2 at angled corner 133-1. Recess 104 may have a third portion 131-3 that meets or joins second portion 131-2 at angled corner 133-2. Portions 131-1, 131-2, and 131-3 may be each be planar and are therefore sometimes also referred to herein as planar portions 131 or planar segments 131 of recess 104.

When antenna resonating element 108 is mounted within recess 104, the folds 120 in antenna resonating element 108 may be aligned with respective angled corners 133 of recess 104 (e.g., angled corner 133-1 may be aligned with fold 120-1, angled corner 133-2 may be aligned with fold 120-2, etc.). Each portion 131 of recess 104 may be pressed against (adhered to) and may be oriented parallel to a respective portion 130 of antenna resonating element 108. For example, portion 130-1 of antenna resonating element 108 may extend parallel to portion 131-1 of recess 104 (e.g., forming a smooth radio-frequency impedance transition between all of portion 130-1 and outer sidewall 70), portion 130-2 of antenna resonating element 108 may extend parallel to portion 131-2 of recess 104 (e.g., forming a smooth radio-frequency impedance transition between all of portion 130-2 and outer sidewall 70), and portion 130-3 of antenna resonating element 108 may extend parallel to portion 131-3 of recess 104 (e.g., forming a smooth radio-frequency impedance transition between all of portion 130-3 and outer sidewall 70).

In practice, the wireless performance of antenna resonating element 108 may be highly sensitive to the separation between antenna resonating element 108 and conductive plate 86. To help ensure that antenna resonating element 108 is disposed at a desired position despite the presence of folds 120, each portion 130 of antenna resonating element 108 may include a respective alignment hole 112 that receives a corresponding alignment post 106 on outer sidewall 70. To help ensure that antenna resonating element 108 is disposed at the desired position in two dimensions within recess 104 (e.g., horizontally and vertically), alignment holes 112 may include a first set of one or more alignment holes 112A that are elongated along a first linear axis 132 and may include a second set of one or more alignment holes 112B that are elongated along a second linear axis 134 orthogonal to linear axis 132.

In addition, alignment posts 106 may include one or more alignment posts 106A that protrude through alignment holes 112A and may include one or more alignment posts 106B that protrude through alignment holes 112B. Each alignment post 106 may include crush ribs 136 that help to secure each portion 130 of antenna resonating element 108 in a desired position given the orientation of the corresponding alignment hole 112. The crush ribs 136 on alignment posts 106A may be oriented parallel to linear axis 134 and orthogonal to the crush ribs 136 on alignment posts 106B.

For example, as shown in FIG. 8, antenna resonating element 108 may include a first alignment hole 112A in portion 130-1 and a second alignment hole 112A in portion 130-3. A first alignment post 106A may protrude through the alignment hole 112A in portion 130-1. A second alignment post 106A may protrude through the alignment hole 112A in portion 130-3. The crush ribs 136 of alignment posts 106A may be oriented orthogonal to the longitudinal axis of alignment holes 112A (e.g., orthogonal to linear axis 132 and parallel to linear axis 134). This may configure antenna resonating element 108 to exhibit sufficient tolerance in the horizontal placement of antenna resonating element 108 when mounted within recess 104. On the other hand, the crush ribs 136 of alignment post 106B may be oriented orthogonal to the longitudinal axis of its alignment hole 112B (e.g., orthogonal to linear axis 134 and parallel to linear axis 132). This may configure antenna resonating element 108 to exhibit sufficient vertical tolerance in the vertical placement of antenna 108 when mounted within recess 104. These expanded tolerances may, for example, help to ensure that antenna resonating element 108 is disposed in a fixed and predetermined spatial relationship relative to other conductive material in device 10 (e.g., conductive plate 86), helping to maximize antenna performance.

The example of FIG. 8 is illustrative and non-limiting. If desired, antenna resonating element 108 may implement other antenna resonating element architectures (e.g., a slot antenna architecture, a dipole antenna architecture, a patch antenna architecture, a monopole antenna architecture, etc.). Antenna resonating element 108 may have any desired number of straight and/or curved edges. If desired, antenna resonating element 108 may include multiple branches or arms (e.g., for covering multiple frequency bands).

Figure 9:
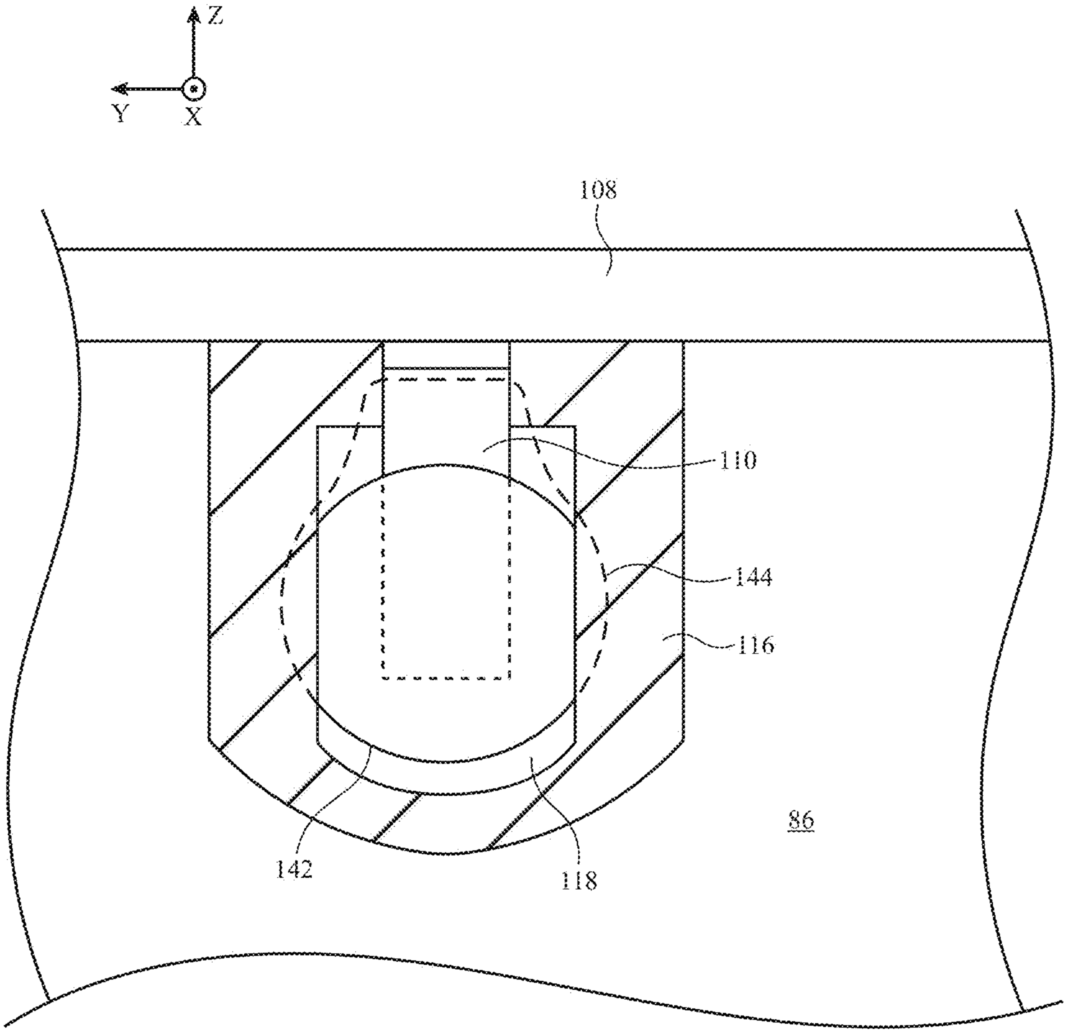
FIG. 9 is a top view of an illustrative return path in an antenna of the type shown in FIGS. 4-8 in accordance with some embodiments.

FIG. 9 is a top view showing how return path 110 of antenna resonating element 108 may be coupled to conductive plate 86. As shown in FIG. 6, conductive plate 86 may include a laser etched region 116 that laterally surrounds contact pad 118 (e.g., a region of conductive plate 86 that is not laser etched). Return path 110 may extend downwards and may be folded outwards to contact conductive plate 86 at contact pad 118. A conductive interconnect structure such as solder ball 142 may be used to help establish a robust electrical (grounding) connection from antenna resonating element 108 to conductive plate 86 through return path 110. Solder ball 142 may also help to mechanically attach antenna resonating element 108 to conductive plate 86.

In practice, the performance and operating frequency of antenna 30 is sensitive to the placement and shape of solder ball 142. In the absence of laser etched region 116, during deposition, solder in solder ball 142 may flow unpredictably up return path 110 and/or away from return path 110, as shown by dashed region 144. This can unpredictably alter the radio-frequency performance of the antenna (e.g., shifting the impedance of the return path to ground, the grounding location, the frequency response of the antenna, the efficiency of the antenna, etc.) between devices 10. Laser etched region 116 may help to control the location, placement, and shape of solder ball 142 to more precisely control the shape/placement of solder ball 142 and the location/impedance of the path to ground for antenna resonating element 108. For example, laser etched region 116 may help to prevent the flow of solder in solder ball 142 away from contact pad 118 (e.g., solder does not adhere to laser etched region 116 and laser etched region 116 may serve to confine solder ball 142 to the lateral area of contact pad 118). This may help to precisely tune/control the location and impedance of the grounding path from antenna resonating element 108 in a predictable manner that is consistent between devices 10.

Figure 10:
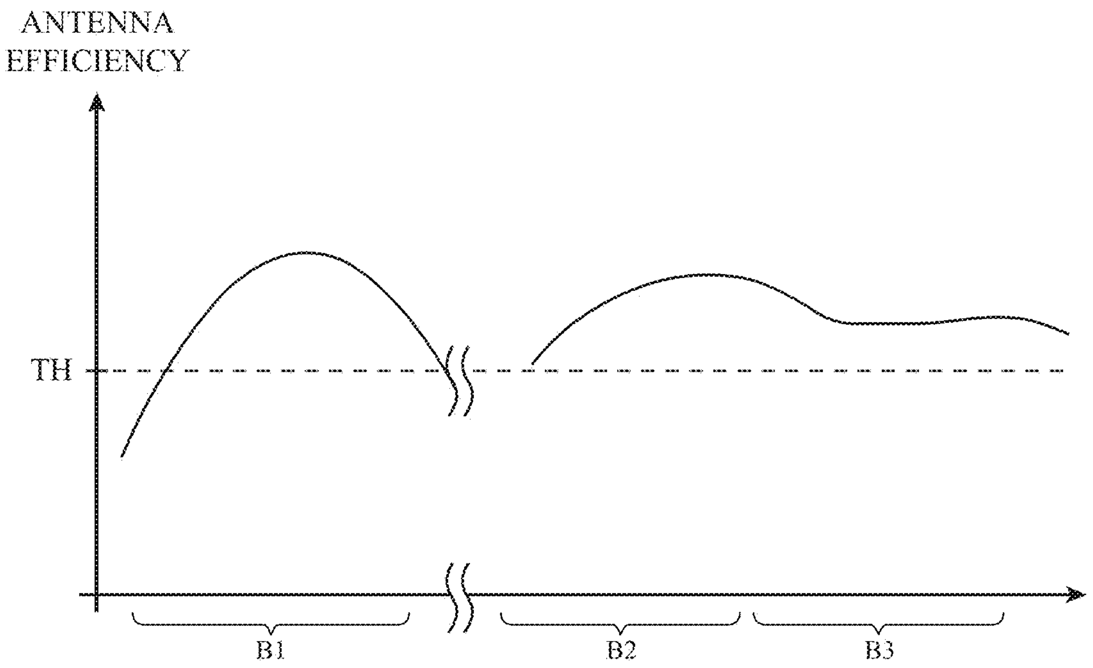
FIG. 10 is a plot of performance (antenna efficiency) as a function of frequency for an illustrative antenna of the type shown in FIGS. 4-9 in accordance with some embodiments.

FIG. 10 is a plot of antenna performance (antenna efficiency) for antenna 30. As shown by FIG. 10, antenna 30 may exhibit an antenna efficiency that exceeds a threshold efficiency TH across a set of one or more frequency bands B such as at least frequency bands B1, B2, and B3. Band B1 may be, for example, a 2.4 GHz Wi-Fi/Bluetooth band (e.g., between around 2.4 GHz and around 2.5 GHz). Band B2 may be, for example, a 5 GHz Wi-Fi band (e.g., between around 5150 MHz and around 5850 MHz). Band B3 may be, for example, a Wi-Fi 6E band (e.g., between around 5900 MHz and around 7200 MHz). Antenna 30 may exhibit this type of multiband response with minimal interference from other device components and antennas 30 and while exhibiting a sufficiently wide radiation pattern through dielectric foot 12B (FIG. 3) despite the compact form factor of device 10. The example of FIG. 10 is illustrative and non-limiting. Antenna 30 may be configured to operate in any desired frequency bands at any desired frequencies.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a housing that includes a dielectric foot and a conductive body, wherein the dielectric foot includes a first wall coupled to the conductive body, a second wall parallel to the first wall, and a sidewall that couples the first wall to the second wall and that is curved around a central axis of the electronic device; and an antenna mounted to the second wall within the dielectric foot, wherein the antenna includes a conductive plate, a conductive cavity mounted to the conductive plate, a dielectric wall mounted to the conductive plate and the conductive cavity, wherein the dielectric wall has a first surface facing and curved parallel to the sidewall of the dielectric foot, and an antenna resonating element mounted to a second surface of the dielectric wall that faces the conductive cavity.

2. The electronic device of claim 1, wherein the second wall is configured to rest on a surface, the sidewall extending at a non-parallel angle from an outer peripheral edge of the second wall to an inner peripheral edge of the first wall.

3. The electronic device of claim 2, wherein the non-parallel angle is non-perpendicular with respect to the first and second walls.

4. The electronic device of claim 3, further comprising:

intake vents in the sidewall of the dielectric foot; and exhaust vents in the sidewall of the dielectric foot, wherein the dielectric wall overlaps at least some of the intake vents.

5. The electronic device of claim 1, wherein the conductive cavity comprises a folded piece of sheet metal.

6. The electronic device of claim 5, wherein the folded piece of sheet metal comprises a first conductive wall opposite the conductive plate and a second conductive wall that extends from the first conductive wall to the conductive plate opposite the dielectric wall.

7. The electronic device of claim 6, wherein the second conductive wall comprises a conductive lip that is welded to a lateral periphery of the conductive plate.

8. The electronic device of claim 1, further comprising:

a system ground in the conductive body; and a ring of conductive adhesive that couples the conductive plate to the system ground in the conductive body.

9. The electronic device of claim 1, wherein the second surface of the dielectric wall comprises a recess and the electronic device further comprises:

a layer of adhesive that adheres the antenna resonating element to the second surface of the dielectric wall within the recess.

10. The electronic device of claim 9, wherein the second surface comprises first, second, and third portions within the recess, the first portion is non-parallel to the second portion, and the third portion is non-parallel to the first and second portions.

11. The electronic device of claim 10, wherein the antenna resonating element comprises first, second, and third segments, the first segment overlaps the first portion of the second surface and is non-parallel to the second segment, the second segment overlaps the second portion of the second surface and is non-parallel to the third segment, and the third segment overlaps the third portion of the second surface.

12. The electronic device of claim 11, wherein the antenna resonating element comprises a first alignment hole in the first segment, a second alignment hole in the second segment, and a third alignment hole in the third segment, the dielectric wall comprising:

a first alignment pin on the first portion of the second surface and protruding through the first alignment hole in the first segment;

a second alignment pin on the second portion of the second surface and protruding through the second alignment hole in the second segment; and a third alignment pin on the third portion of the second surface and protruding through the third alignment pin in the third segment.

13. The electronic device of claim 12, wherein the first alignment hole comprises a first elongated alignment hole having a first longitudinal axis, the second alignment hole comprises a second elongated alignment hole having a second longitudinal axis orthogonal to the first longitudinal axis, and the third alignment hole comprises a third elongated alignment hole extending parallel to the first longitudinal axis, the first alignment pin comprises first crush ribs orthogonal to the first longitudinal axis, the second alignment pin comprises second crush ribs orthogonal to the second longitudinal axis, and the third alignment pin comprises third crush ribs.

14. The electronic device of claim 1, wherein the conductive plate comprises a laser etched region that laterally surrounds a non-laser-etched region of the conductive plate, the antenna further comprises a return path that couples the antenna resonating element to the conductive plate within the non-laser-etched region of the conductive plate, and the antenna further comprises a solder ball that couples the return path to the non-laser-etched region of the conductive plate.

15. An antenna comprising:

a grounded plate;

folded sheet metal mounted to the grounded plate, wherein the grounded plate and the folded sheet metal surround a cavity having an open end;

a dielectric wall that is mounted to the folded sheet metal and the grounded plate and that overlaps the open end of the cavity;

a resonating element mounted to the dielectric wall within the cavity, wherein the resonating element includes a first segment, a second segment coupled to the first segment at a first fold of the antenna resonating element, and a third segment coupled to the second segment at a second fold of the antenna resonating element; and a return path that couples the antenna resonating element to the grounded conductive plate.

16. The antenna of claim 15, wherein:

the second segment is planar and non-parallel to the first segment, the third segment is planar and non-parallel to the first and second segments, the dielectric wall has a surface facing the cavity, the first segment is mounted to a first portion of the surface that extends parallel to the first segment, the second segment is mounted to a second portion of the surface that extends parallel to the second segment, and the third segment is mounted to a third portion of the surface that extends parallel to the third segment.

17. The antenna of claim 16, wherein the dielectric wall has an additional surface opposite the surface, the additional surface being continuously curved across a length of the antenna resonating element.

18. The antenna of claim 16, further comprising:

a first alignment hole in the first segment and extending along a first longitudinal axis;

a second alignment hole in the second segment and extending along a second longitudinal axis orthogonal to the first longitudinal axis;

a first alignment pin on the dielectric wall and extending through the first alignment hole; and a second alignment pin on the dielectric wall and extending through the second alignment hole.

19. An electronic device comprising:

a housing that includes a first wall, a second wall parallel to the first wall, and a third wall that is curved and that couples the first wall to the second wall; and an antenna mounted to the second wall within the housing, wherein the antenna includes a conductive plate, a conductive cavity mounted to the conductive plate, a dielectric wall mounted to the conductive plate, wherein the dielectric wall has a first surface facing the third wall and extending parallel to the third wall, and an antenna resonating element mounted to a second surface of the dielectric wall opposite the first surface.

20. The electronic device of claim 1, wherein:

the sidewall is curved around a central axis of the electronic device, and the sidewall extends at a non-parallel angle from an outer peripheral edge of the second wall to an inner peripheral edge of the first wall.

* * * * *